US011954813B2

(12) United States Patent
Wang et al.

(10) Patent No.: US 11,954,813 B2
(45) Date of Patent: Apr. 9, 2024

(54) THREE-DIMENSIONAL SCENE CONSTRUCTING METHOD, APPARATUS AND SYSTEM, AND STORAGE MEDIUM

(71) Applicant: BOE Technology Group Co., Ltd., Beijing (CN)

(72) Inventors: Youxue Wang, Beijing (CN); Xiaohui Ma, Beijing (CN); Kai Geng, Beijing (CN); Mengjun Hou, Beijing (CN); Qian Ha, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 101 days.

(21) Appl. No.: 17/789,217

(22) PCT Filed: Sep. 2, 2021

(86) PCT No.: PCT/CN2021/116304
§ 371 (c)(1),
(2) Date: Jun. 27, 2022

(87) PCT Pub. No.: WO2022/088982
PCT Pub. Date: May 5, 2022

(65) Prior Publication Data
US 2023/0032036 A1    Feb. 2, 2023

(30) Foreign Application Priority Data

Oct. 30, 2020    (CN) .......................... 202011197688.9

(51) Int. Cl.
*G06T 19/20*     (2011.01)
*G06T 7/12*      (2017.01)
*G06T 17/20*     (2006.01)

(52) U.S. Cl.
CPC ................ *G06T 19/20* (2013.01); *G06T 7/12* (2017.01); *G06T 17/20* (2013.01); *G06T 2219/2004* (2013.01)

(58) Field of Classification Search
CPC . G06T 17/20; G06T 19/20; G06T 2219/2004; G06T 7/12; G06T 15/005;
(Continued)

(56) References Cited

U.S. PATENT DOCUMENTS

| 10,210,618 B1 | 2/2019 | Kuffner et al. |
| 2010/0207936 A1* | 8/2010 | Minear ..................... G06T 7/30 345/419 |

(Continued)

FOREIGN PATENT DOCUMENTS

| CN | 104599314 A | 5/2015 |
| CN | 106803267 A | 6/2017 |

(Continued)

OTHER PUBLICATIONS

International Search Report for PCT/CN2021/116304 dated Dec. 1, 2021.

(Continued)

*Primary Examiner* — Ming Wu
(74) *Attorney, Agent, or Firm* — Ling Wu; Stephen Yang; Ling and Yang Intellectual Property (57) ABSTRACT

A three-dimensional scene constructing method, apparatus and system, and a storage medium. The three-dimensional scene constructing method includes: acquiring point cloud data of a key object and a background object in a target scene, wherein the point cloud data of the key object comprises three-dimensional information and corresponding feature information, and the point cloud data of the background object at least comprises three-dimensional information; establishing a feature database of the target scene, (Continued)

wherein the feature database at least comprises a key object feature library for recording three-dimensional information and feature information of the key object; performing registration and fusion on the point cloud data of the key object and the point cloud data of the background object, so as to obtain a three-dimensional model of the target scene; and when updating the three-dimensional model, reconstructing the three-dimensional model in a regional manner according to the feature database.

17 Claims, 4 Drawing Sheets

(58) Field of Classification Search
CPC ........... G06T 17/00; G06T 2207/10028; G06T 2210/56; G06T 7/10; H04N 13/275
See application file for complete search history.

(56) References Cited

U.S. PATENT DOCUMENTS

| | | | |
|---|---|---|---|
| 2015/0036916 A1* | 2/2015 | Mundhenk | G06T 7/593 |
| | | | 382/154 |
| 2015/0084951 A1* | 3/2015 | Boivin | H04N 23/80 |
| | | | 345/419 |
| 2015/0105889 A1 | 4/2015 | Tsai | |
| 2018/0161986 A1 | 6/2018 | Kee et al. | |
| 2019/0035150 A1* | 1/2019 | Owechko | G06T 17/20 |
| 2019/0272671 A1 | 9/2019 | Zhang et al. | |
| 2019/0378283 A1 | 12/2019 | Boult | |

FOREIGN PATENT DOCUMENTS

| | | |
|---|---|---|
| CN | 107958482 A | 4/2018 |
| CN | 108830879 A | 11/2018 |
| CN | 110798677 A | 2/2020 |
| CN | 112367514 A | 2/2021 |
| IN | 201947004225 A | 2/2019 |
| JP | 2020-160812 A | 10/2020 |
| WO | 2012029058 A1 | 3/2012 |
| WO | 2013178725 A1 | 12/2013 |
| WO | 2015184764 A1 | 12/2015 |

OTHER PUBLICATIONS

Office Action dated Mar. 17, 2022 for Chinese Patent Application No. 202011197688.9 and English Translation.
Decision to Grant dated Sep. 5, 2022 for Chinese Patent Application No. 202011197688.9 and English Translation.
Kai Geng et al., "A Grey-histogram Based Traffic Detection System", Computer Engineering and Applications, 2006.04:222-225.

* cited by examiner

THREE-DIMENSIONAL SCENE CONSTRUCTING METHOD, APPARATUS AND SYSTEM, AND STORAGE MEDIUM

CROSS-REFERENCE TO RELATED APPLICATIONS

The present application is a U.S. National Phase Entry of International Application No. PCT/CN2021/116304 having an international filing date of Sep. 2, 2021, which claims the priority of Chinese patent application No. 202011197688.9, filed to the CNIPA on Oct. 30, 2020 and entitled "Three-Dimensional Scene Construction Method, Apparatus and System, and Storage Medium". The above-identified applications are hereby incorporated by reference.

TECHNICAL FIELD

The embodiment of the present disclosure relates to, but is not limited to the field of display technology, in particular to a three-dimensional scene construction method, an apparatus, a system and a storage medium.

BACKGROUND

The increasing maturity of 5G technology makes it possible to transmit big data in real time. At the same time, with the development of basic application technologies such as Internet of Things and cloud technology, the demand for remote communication and remote scene presentation is increasingly strong. Scenes such as cloud live broadcast and cloud classroom, which are widely used at present, belong to such technology applications.

However, the current display technology based on live broadcast has some shortcomings, such as less observation angle and fixed display scene.

SUMMARY

The following is a summary of subject matters described herein in detail. The summary is not intended to limit the protection scope of claims.

The invention provides a three-dimensional scene construction method, an apparatus, a system and a storage medium.

In one aspect, embodiments of the present disclosure provide a three-dimensional scene construction method, including: acquiring point cloud data of a key object and a background object in a target scene, wherein the point cloud data of the key object includes three-dimensional information and corresponding feature information, and the point cloud data of the background object at least includes three-dimensional information; establishing a feature database of the target scene, wherein the feature database at least includes a key object feature library for recording three-dimensional information and feature information of the key object; performing registration and fusion on the point cloud data of the key object and the point cloud data of the background object, so as to obtain a three-dimensional model of the target scene; and when updating the three-dimensional model, reconstructing the three-dimensional model according to the feature database.

An embodiment of the present disclosure further provides a computer device, including a processor and a memory storing a computer program runnable in the processor, wherein the processor executes the program to implement the aforementioned acts of the method of three-dimensional scene construction.

In another aspect, the embodiment of the present disclosure further provides a three-dimensional scene construction system including an image acquisition and distance measurement apparatus and a computer device as mentioned above.

In a third aspect, the disclosed embodiments further provide a computer-readable storage medium having stored a computer program executable on a processor, when the computer program is executed by the processor, the aforementioned three-dimensional scene construction method is implemented.

Other features and advantages of the present disclosure will be elaborated in the following specification, and moreover, partially become apparent from the specification or are understood by implementing the present disclosure. Other advantages of the present disclosure may be implemented and obtained by schemes described in the specification, claims and drawings.

After reading and understanding the drawings and the detailed description, other aspects may be understood.

BRIEF DESCRIPTION OF DRAWINGS

The accompanying drawings are used for providing understanding of technical solutions of the present disclosure, and form a part of the specification. They are used for explaining the technical solutions of the present disclosure together with the embodiments of the present disclosure, and do not form a limitation on the technical solutions of the present disclosure. Shapes and sizes of various components in the drawings do not reflect actual scales, and are only intended to schematically illustrate contents of the present disclosure.

DETAILED DESCRIPTION

Multiple embodiments are described in the present disclosure. However, the description is exemplary and unrestrictive. Moreover, it is apparent to those of ordinary skills in the art that there may be more embodiments and implementation solutions in the scope of the embodiments described in the present disclosure. Although many possible combinations of features are shown in the accompanying drawings and discussed in specific implementations, many other combinations of the disclosed features are also possible. Unless expressly limited, any feature or element of any embodiment may be used in combination with, or may replace, any other feature or element in any other embodiment.

The present disclosure includes and conceives combinations with the features and elements known to those of ordinary skills in the art. The embodiments, features, and elements disclosed in the present disclosure may be combined with any conventional feature or element to form a unique solution defined by the claims. Any feature or element of any embodiment may be combined with a feature or an element from another solution to form another unique solution defined by the claims. Therefore, it should be understood that any of the features shown and/or discussed in the present disclosure may be implemented alone or in any suitable combination. Therefore, the embodiments are not to be limited except the limitation by the appended claims and equivalents thereof. Furthermore, various modifications and variations may be made within the scope of the appended claims.

Moreover, when describing representative embodiments, the specification may have presented a method and/or a process as a particular sequence of acts. However, the method or the process should not be limited to the acts with the specific order on the premise that the method or the process is independent of the specific order of the acts described herein. Those of ordinary skills in the art will understand that other orders of act may also be possible. Therefore, the specific order of the acts illustrated in the specification should not be interpreted as a limitation on claims. Moreover, the claims directed to the method and/or process should not be limited to performing their acts in the described order, and those skilled in the art will readily understand that these orders may be varied and still remain within the essence and scope of the embodiments of the present disclosure.

Figure 1:
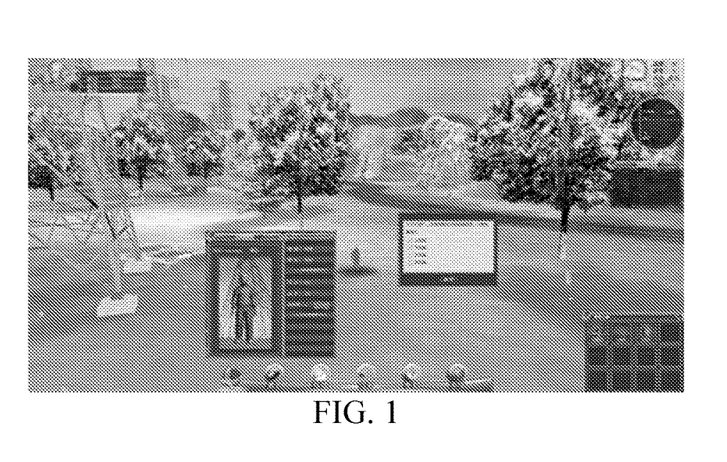
FIG. 1 is an effect picture of a three-dimensional scene construction that needs pre-processing and post-processing.

As mentioned earlier, the current display technology based on live broadcast has some shortcomings, such as less observation angle and fixed display scene. At present, although there are some methods such as scene construction and video fusion, they all rely on early stage scene modeling or panoramic image post-processing technology. As shown in FIG. 1, a fixed scene is formed and rendered in the early stage, and then the objects and people concerned are fused according to the layers to form a three-dimensional scene. Because these methods need pre-processing and post-processing, they are complex and take a long time to process, so they can't build three-dimensional scenes in real time. Moreover, because this method relies on pre-production, it is impossible to construct environmental changes in real time and accurately.

Figure 2:
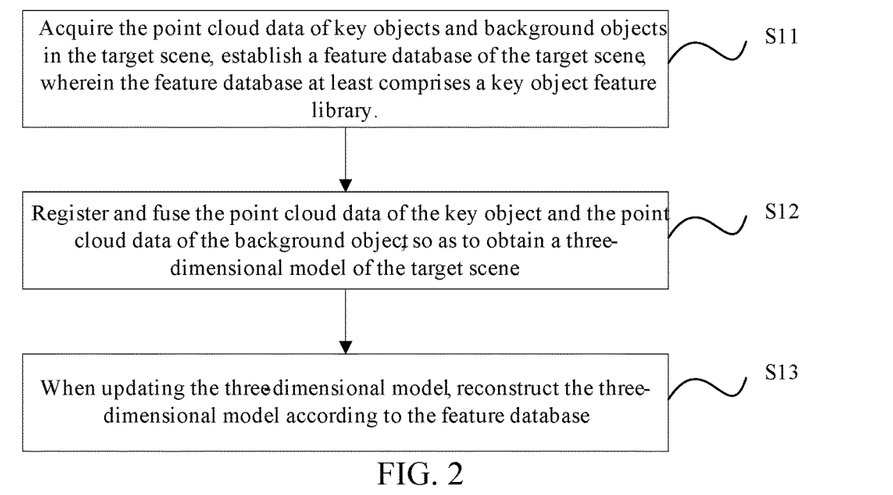
FIG. 2 is a flowchart of a three-dimensional scene construction method of an embodiment of the present disclosure.

The embodiment of the present disclosure provides a three-dimensional scene construction method, as shown in FIG. 2, which includes the following acts:

Act 11, acquiring the point cloud data of key objects and background objects in the target scene, establishing a feature database of the target scene, wherein the feature database at least includes a key object feature library for recording three-dimensional information and feature information of the key object;

For example, a binocular camera may be used to shoot a target scene to obtain a current image of the target scene (hereinafter referred to as a first image), and image segmentation (or feature extraction) may be performed on the current image to distinguish key objects and background objects in the first image.

The current point cloud data of the target scene can be obtained by binocular distance measurement algorithm, which includes point cloud data of a key object and point cloud data of background object, wherein the point cloud data of the key object includes three-dimensional information and corresponding feature information, and the point cloud data of the background object at least includes three-dimensional information. By distinguishing background objects from key objects, only the feature information of key objects may be obtained first, so as to reduce the amount of calculation and achieve the purpose of rapid construction. The feature information may include, for example, but is not limited to, one or more of: texture information, color information, illumination information.

In order to make the three-dimensional scene obtained in the later period have better effect, a high-definition camera may be selected to collect images. In addition, more accurate three-dimensional information may be obtained by combining radar ranging.

The key object may be an object focused (or interested) by the user and may include, for example, but is not limited to one or more of: a moving object, an object located at a preferred viewing angle position of the first image, an object whose size is larger than a preset threshold; the background object is an object other than a key object such as an object located at the edge of a screen and/or a background. The key objects may be one or more.

Act 12, performing registration and fusion on the point cloud data of the key object and the point cloud data of the background object, so as to obtain a three-dimensional model of the target scene; and Act 13, when updating the three-dimensional model, reconstructing the three-dimensional model according to the feature database.

By adopting the method of the embodiment of the disclosure, when the three-dimensional model is initially established, the key object obtains higher three-dimensional construction accuracy by distinguishing the background object from the key object, so that the calculation amount may be reduced on the one hand, and the real-time performance of the model construction may be improved on the other hand. In the subsequent updating of three-dimensional models, the key objects may be reconstructed first based on feature database. With the increase of updating times, more realistic three-dimensional model effects may be gradually obtained to improve the user experience. The method of the disclosure has low requirements on external apparatuses, does not need modeling in advance, and can achieve real-time three-dimensional scene construction.

In an exemplary embodiment, the feature database may further include an edge region feature library and a mask region feature library; after performing registration and fusion on the point cloud data of the key object and the point cloud data of the background object, the method further includes: determining a peripheral edge region of the key object, acquiring three-dimensional information and feature information of the peripheral edge region, and storing the three-dimensional information of the peripheral edge region, corresponding feature information, and the key object corresponding to the peripheral edge region in the edge region feature library; inspecting three-dimensional information and feature information of each mask region shielded by a key object based on the edge region feature library, and storing the three-dimensional information of the mask region, the corresponding feature information, and the key object corresponding to the mask region in the mask region feature library; and updating a three-dimensional model of the target scene based on the mask region feature library.

An region within a preset distance range around the outline of a key object may be set as a peripheral edge region of the key object, or a regular shape containing the key object may be set in advance, and an region between the edge of the regular shape and the edge of the outline of the key object may be set as a peripheral edge region of the key object.

By using the feature information of the peripheral edge region of the key object to estimate the three-dimensional features of the mask region, a better three-dimensional display effect may be obtained without complex image acquisition equipment, and the requirements for external equipment are low. In addition, because key objects (such as key object identifiers) are stored in the edge region feature library and the mask region feature library, data query may be carried out quickly in the feature database with key objects as indexes. When there are a plurality of key objects, mask regions of different key objects may be distinguished and constructed step by step in time sharing.

In an exemplary embodiment, the estimation of the three-dimensional information and feature information of each mask region shielded by a key object based on the edge region feature library includes: for any mask region, determining the key object corresponding to the mask region; determining the three-dimensional information and the feature information of the peripheral edge region corresponding to the key object according to the edge region feature library; determining the change rule of the three-dimensional information and the feature information according to the three-dimensional information and the feature information of the peripheral edge region; and estimating the three-dimensional information and the feature information of the mask region according to the change rule of the three-dimensional information and the feature information.

Because the peripheral edge regions of key objects in the image can reflect the background features of the mask region, the features of the mask region may be estimated according to the peripheral edge regions, and the requirements for external apparatuses are low.

For example, the following acts may be used to determine the pattern of change: determining a plurality of sampling points on an outer boundary of a mask region, wherein the outer boundary of the mask region overlap an inner boundary of the peripheral edge region; determining the three-dimensional information and the feature information of each sampling point according to the three-dimensional information and the feature information of the peripheral edge region; for each sampling point, searching an image region similar to the feature information of the sampling point in a direction away from the mask region; and acquiring the three-dimensional information change gradient and the feature information change gradient in the image region.

In the above act, when looking for an image region whose feature information is similar to the feature information of the sampling point in the direction away from the mask region, the search may be carried out in the peripheral edge region, and the calculation speed is fast. Alternatively, the search may be carried out beyond the peripheral edge region, so that a better speculative effect may be obtained.

In an exemplary embodiment, the method further includes: when the three-dimensional position and/or feature information of the key object in the target scene image is changed, acquiring the point cloud data of the key object at the changed place and updating the three-dimensional model. When only the three-dimensional model of key objects is updated, the calculation amount may be greatly reduced, and the changed three-dimensional model may be obtained quickly. When the background object changes due to the movement of key objects, for example, the background part (original mask region background) which was not displayed before may be displayed. At this time, the point cloud data of the background part may be formed by the estimated three-dimensional information and feature information of the mask region, and the three-dimensional reconstruction of this part of the region may be performed.

In an exemplary embodiment, point cloud data of a key object at a change place may be acquired in any of the following ways, including: acquiring point cloud data at the change place of the key object through an image acquisition apparatus, it is acquired a better display effect by adopting this method; or, adopting the three-dimensional information of the key object at the change place to update the point cloud data of the key object, and keeping the original feature information by updating only the three-dimensional information to ensure the real-time performance; or predicting the change place of the key object by using motion estimation or motion compensation, calculating the point cloud data of the change place in advance, and updating the three-dimensional model by using the point cloud data of the change place, and the real-time performance and display effect may be guaranteed simultaneously through the pre-estimation.

Wherein, after the point cloud data of the key object at the change place is pre-calculated by adopting motion estimation or motion compensation, the method may further include: acquiring the current actual point cloud data of the key object in the target scene, comparing with the pre-calculated point cloud data, determining the point cloud data of the difference part, and re-updating the three-dimensional model with the point cloud data of the difference part.

In an exemplary embodiment, when updating the three-dimensional model, reconstructing the three-dimensional model according to the feature database includes: based on the feature database, acquiring part or all dense point cloud data of one or a plurality of regions every other frame or a plurality of frames of target scene images, and performing dense reconstruction on the three-dimensional model with the dense point cloud data.

In order to get the three-dimensional model quickly, the sparse point cloud data may be obtained when the three-dimensional model is initially established, and the dense point cloud data may be obtained during the updating process. For the same location, when the accuracy of the point cloud obtained by the current frame is higher than that obtained by the previous frame, the point cloud obtained by the current frame is dense point cloud and the point cloud obtained by the previous frame is sparse point cloud. In the dense point cloud, the distance between points is smaller than that in sparse point cloud, or the content of feature information in dense point cloud may be more detailed than that in sparse point cloud.

When updating the three-dimensional model, for example, the dense point cloud data of a local part of the key object may be acquired step by step in a time-sharing manner, and the key object model in the three-dimensional model may be updated with the dense point cloud data until all the key object models are updated.

For another example, the dense point cloud data of the local part of the background object is gradually acquired in a time-sharing manner, and the background object model in the three-dimensional model is updated with the dense point cloud data until all the background object models are updated.

By reconstructing the three-dimensional model in different regions, the huge reconstruction process may be disassembled into small processes one by one according to the regions, and the calculation amount of each time may be reduced. For example, a part of the three-dimensional model may be reconstructed at each time phase. The time phase may be one or more frames. For example, for every other frame or a plurality of frames of the target scene image, the region information in the feature database is used as an index to obtain dense point cloud data of a part of an region, or all of an region, or parts of the plurality of regions, and dense reconstruction is carried out on the three-dimensional model with the dense point cloud data.

In an exemplary embodiment, the point cloud data of the mask region may be estimated from the point cloud data of the dense reconstructed edge region, to update the three-dimensional model. For example, a background object feature library may be set up for storing three-dimensional information and feature information of background objects. Because the peripheral edge region belongs to the background object, when the dense point cloud of the background object is obtained, the dense point cloud of the peripheral edge region, namely three-dimensional information and detailed feature information, may be obtained. Then the three-dimensional information and feature information of the corresponding mask region may be estimated according to the dense point cloud of the peripheral edge region, thus acquiring better three-dimensional display effect.

In an exemplary embodiment, the method may further include estimating the point cloud data of adjacent positions by using acquired dense point cloud data. That is to say, according to the features of scenes or objects, point cloud data of other parts may be generated according to a part of point cloud data, thus reducing the amount of calculation and improving the real-time performance of three-dimensional scene construction.

In an exemplary embodiment, the method further includes adding objects in the target scene as the key objects, and performing dense reconstruction on the newly added key objects. If the newly added object exists in the original target scene, that is, the three-dimensional model has been built, the dense point cloud may be obtained in the subsequent process for dense reconstruction. If there is no new object in the original target scene, the sparse point cloud may be obtained first, and the three-dimensional model may be built. In the update process, the dense point cloud may be gradually obtained for dense reconstruction. That is, by gradually adding key objects, a better three-dimensional model may be gradually obtained.

In an exemplary embodiment, the feature database includes a key object feature library, an edge region feature library and a mask region feature library, wherein: the key object feature library is used for storing three-dimensional information of key objects and corresponding feature information; the edge region feature library is used for storing three-dimensional information of the peripheral edge region, corresponding feature information and key objects corresponding to the peripheral edge region; and the mask region feature library is used for storing three-dimensional information of the mask region, corresponding feature information and key objects corresponding to the mask region.

The embodiment of the present invention constructs a three-dimensional scene by adopting different precision for the key object and the background object in the image, which can improve the real-time performance of the construction of the three-dimensional scene. In addition, by gradually updating, the amount of updates and the content of scene model reconstruction may be reduced, and the real-time performance of three-dimensional scene construction may be further improved. By adopting the scheme of the embodiment of the disclosure, the three-dimensional scene of the current target scene may be truly presented in real time.

Compared with the video fusion scheme, the embodiment scheme of the disclosure can greatly reduce the complexity of the image fusion algorithm, improve the construction speed of the digital scene of the entity environment, and greatly improve the construction accuracy. Compared with the semi-game scene, all the production processes of the disclosed scheme are automatically completed by the system, without manual modeling and rendering in the early and later stages.

Taking the image collected by binocular camera as an example, the above method is explained through an application embodiment.

Act 21, collecting a first image of the current target scene; The binocular image acquisition equipment may be used for acquisition, so as to facilitate the subsequent point cloud data acquisition.

Act 22, determining a key object in the first image.

Figure 3:
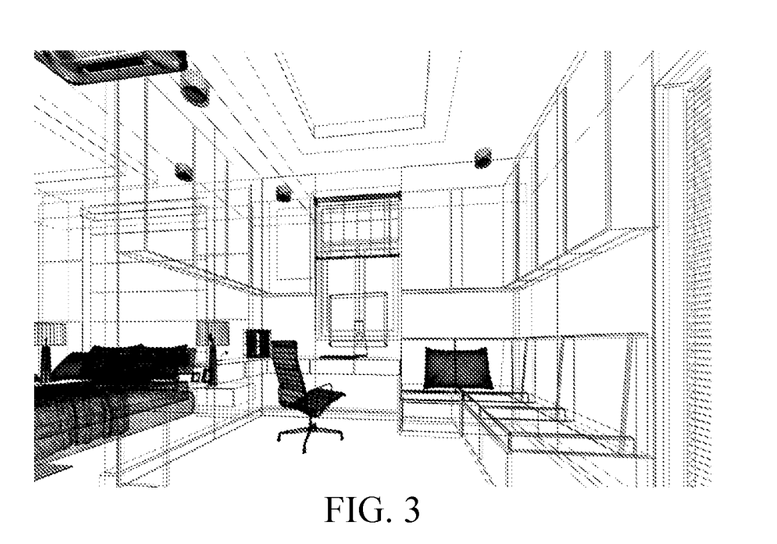
FIG. 3 is a schematic diagram of contour extraction of a two-dimensional image of a scene of an embodiment of the present disclosure.

For example, the first image may be preliminarily segmented (i.e., parts that belongs to one object is segmented), the distribution relationship (i.e., the position relationship) of the object is preliminarily marked, and the object contour is extracted to obtain the contour map of the scene. FIG. 3 is an example map of the preliminary contour of the scene.

In this embodiment, the purpose of image segmentation is to separate pixel regions belonging to different objects, and a threshold-based segmentation method, an edge detection-based segmentation method, or a depth learning-based segmentation method may be adopted. For example, semantic segmentation is adopted to classify the semantics of each region, that is, what object the block region is.

Based on the contour map, the objects in the first image may be divided into key objects and background objects. In which is following.

The key object may be an object that the user pays attention to (or is interested in), for example, whether the object moves may be judged in combination with the previous frame image, and the moving object is determined as an object that the user pays attention to. For another example, an object located at a better viewing angle (e.g. an object located in a central region of an image) may be determined as an object of interest to the user. For another example, it may be determined whether the object is of interest to the user according to whether the size (region) of the object is greater than the first preset size threshold. The above methods for determining key objects may be used in combination. For example, it can be combined with the position and size of the object to determine whether it is a key object, or determine whether it is a key object by combining whether to move and the position of the object, or determine whether it is a key object by combining whether to move and the size of the object, or determine whether it is a key object by combining whether it is moving, the position of the object and the size of the object.

The background object may be an object other than a key object or a background, and may include, for example, one or more of a background, an object located at the edge of a screen, and an object having a size smaller than a first preset size threshold. The object located at the edge of the screen may be judged in combination with the object position and region, for example, the object located at the edge of the image and whose area is less than the second preset size threshold is regarded as a background object, so that unimportant foreground objects may be excluded. The second preset size threshold is smaller than the first preset size threshold.

After determining the key objects, when obtaining the point cloud data later, the point clouds of the key objects may be obtained with higher accuracy than the background objects, while the point clouds of the background objects may be obtained with lower accuracy.

In order to facilitate subsequent processing and speed up processing, a key object feature library is generated, which records the identification of key objects, and can also record one or more of the following information, such as the position and size of key objects.

Act 23, acquiring point cloud data in a target scene, wherein the point cloud data of the key object includes three-dimensional information and corresponding feature information, and the point cloud data of the background object at least includes three-dimensional information; which include the following acts: Act 231, collecting coordinate information and feature information of the target scene, and only collecting feature information for key objects at this time.

The above coordinate information may be obtained by binocular distance measurement algorithm combined with radar ranging algorithm.

Among them, binocular image acquisition equipment combined with parallax distance measurement method may be used to obtain depth information. For example, the binocular image acquisition equipment may be calibrated first, and the original image may be corrected according to the calibration result. The corrected two images are located in the same plane and parallel to each other, and the corrected two images are performed to match the pixel points, and the depth value of each pixel is calculated according to the matching result.

Alternatively, accurate depth measurement may be carried out in combination with radar. That is, the depth information obtained by radar ranging is used to replace or correct the depth of each pixel in the image.

Similarly, the feature information may be obtained by combining binocular distance measurement algorithm with radar ranging algorithm. The feature information includes features for constructing a three-dimensional model of the object and may include, for example, but is not limited to one or more of: texture information, color information, illumination information. Other methods may be used to obtain the feature information, and embodiments of the present disclosure are not limited on how to obtain the feature information.

When collecting feature information, the acquisition accuracy of key objects may be higher than that of background objects.

Act 232, converting coordinate information into world coordinates.

Figure 4:
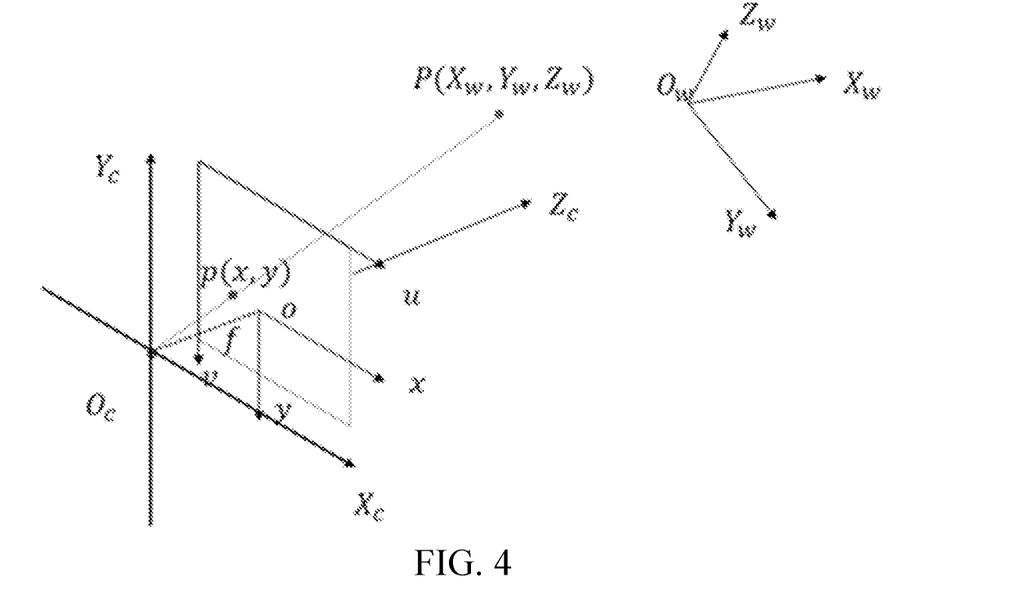
FIG. 4 is a schematic diagram of coordinate system relationship.

As shown in FIG. 4, four coordinate systems are involved in image processing, including the world coordinate system for describing the camera position (Ow–XwYwZw in the figure, unit m), the camera coordinate system with the optical center as the origin (Oc–XcYcZc in the figure, unit m), the image coordinate system with the origin as the midpoint of the image (o–xy in the figure, unit mm), and the pixel coordinate system with the origin in the upper left corner of the image (u-v in the figure). For any real point P in life, that is, any point P (Xw, Yw, Zw) in the world coordinate system, the imaging point in the image is p, its coordinates in the image coordinate system are (x, y), and its coordinates in the pixel coordinate system are (u, v). The focal length f of the camera is the distance between the origin Oc of the camera coordinate system and the origin o of the image coordinate system, $f=\|o-Oc\|$. The following formula may be used for world coordinate conversion:

$$Z_c \begin{pmatrix} u \\ v \\ 1 \end{pmatrix} = \begin{pmatrix} \frac{1}{dx} & 0 & u_0 \\ 0 & \frac{1}{dy} & v_0 \\ 0 & 0 & 1 \end{pmatrix} \begin{pmatrix} f & 0 & 0 \\ 0 & f & 0 \\ 0 & 0 & 1 \end{pmatrix} (R\ T) \begin{pmatrix} X_w \\ Y_w \\ Z_w \\ 1 \end{pmatrix} =$$

$$\begin{pmatrix} f_x & 0 & u_0 \\ 0 & f_y & v_0 \\ 0 & 0 & 1 \end{pmatrix} (R\ T) \begin{pmatrix} X_w \\ Y_w \\ Z_w \\ 1 \end{pmatrix} = M_1 M_2 \begin{pmatrix} X_w \\ Y_w \\ Z_w \\ 1 \end{pmatrix}$$

wherein, (u0, v0) represents the coordinates of Oc in the u-v coordinate system, dx and dy represent the physical dimensions of each pixel on the horizontal axis x and vertical axis y, respectively, R is the rotation matrix, T is the translation vector.

$$\begin{pmatrix} X_c \\ Y_c \\ Z_c \end{pmatrix} = (R|T) \begin{pmatrix} X_w \\ Y_w \\ Z_w \\ 1 \end{pmatrix}$$

The coordinate information is converted into world coordinates to obtain point cloud data.

Point cloud data refers to a set of vectors in a three-dimensional coordinate system. These vectors are usually represented in the form of three-dimensional coordinates of X, Y, Z. In addition to representing three-dimensional information of objects, the point cloud data may also contain one or more of the following information: color information (such as RGB values), gray level information (such as gray level values, which may be used to represent illumination information), depth information (used to represent distance), texture information, belonging object identification, etc.

A set of point cloud data may be expressed as: Point Cloud={P1, P2, P3 . . . Pn}, where Pi={Xi, Yi, Zi . . . } represents a point in space.

Act 233, performing registration and fusion on the two point cloud data collected by the binocular image acquisition apparatus.

Point cloud registration is to obtain better coordinate transformation through calculation, and integrate point cloud data from different perspectives into the specified coordinate system through rigid transformation such as rotation and translation. In other words, the two point clouds for registration may overlap each other through position transformation such as rotation and translation, so the two point clouds belong to rigid transformation, that is, the shape and size are exactly the same, but only the coordinate positions are different. Point cloud registration is to find the coordinate position transformation relationship between two point clouds.

The basic input and output of point cloud registration are: two rigid transformed point clouds: source point cloud and target point cloud, which have the same shape and size;

A rotational translation transformation matrix RTMatrix (RT) is obtained by point cloud registration, the matrix represents the position transformation relationship between the two point clouds, that is, the source point cloud may be transformed to the position of the target point cloud by RT, so that they can coincide.

Point cloud registration includes coarse registration and fine registration, in which: Point cloud coarse registration: extract the neighborhood geometric features of source and target, quickly determine the corresponding relationship of point pairs between them through geometric features, and then calculate this relationship to obtain the initial transformation matrix. The geometric features of point cloud may be characterized by Fast Point Feature Histogram (FPFH).

Point cloud fine registration: accurate registration is to use the known initial transformation matrix, through iterative nearest point algorithm (ICP algorithm) and other calculations to get a more accurate solution. ICP algorithm constructs rotation translation matrix RT by calculating the distance between the corresponding points of source and target, and calculates the mean square error after transformation by transforming the source by the RT. If the mean square error satisfies the threshold condition, the algorithm ends. If not, the iteration continues until the error satisfies the threshold condition or the iteration times are used up.

Two point clouds may be mapped into the same coordinate system by point cloud registration.

Act 284, fusing the registered point cloud data to obtain a preliminary three-dimensional construction model.

The fusion processing refers to superimposing the feature information on the basis of the registered point cloud.

Through point cloud fusion, the initial three-dimensional image of the target scene may be obtained.

Act 24, based on the fused point cloud data, updating a feature database, including updating a key object feature library and an edge region feature library, and speculating the point cloud data of a mask region according to the edge region feature library; The act includes the following acts: Act 241, updating the key object feature library; based on the fused point cloud data, recording the three-dimensional information corresponding to each key object and the feature information corresponding to the three-dimensional information in the key object feature library;

Act 242, determining the range of the peripheral edge region, generating an edge region feature library, and recording three-dimensional information and feature information of the edge region in the edge region feature library.

Figure 5:
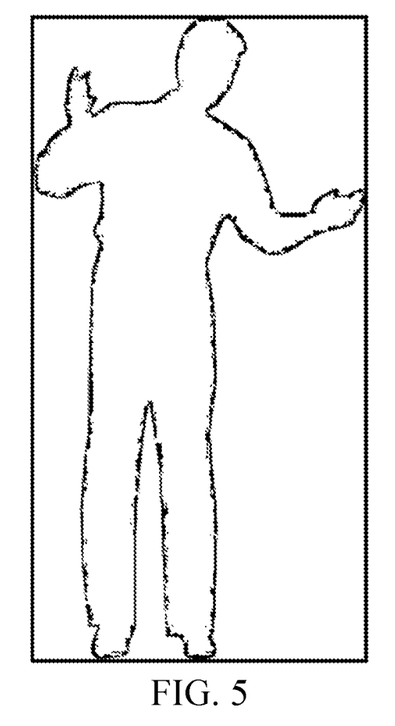
FIG. 5 is a schematic diagram of a scope of a peripheral edge region of an embodiment of the present disclosure.

The peripheral edge region range may be determined in the following ways. The region within the preset distance range of the contour periphery of any key object may be set as the peripheral edge region of the key object; or a regular border containing the key object may be set, a region between the edge of the regular border and the contour edge of the key object is set as a peripheral edge region of the key object, and the shape of the regular border may be determined according to the contour of the first type of object, for example, may include but not limited to one or more of the following: circle, ellipse, triangle, quadrilateral, pentagon, hexagon, etc. As shown in the example in FIG. 5, the person in the figure is the key object, the rectangular border in the figure contains the contour of the person, and the region between the rectangular border and the contour of the person is the peripheral edge region (or the edge region for short). In another exemplary embodiment, the border does not have to intersect the key object contour.

Figure 6:
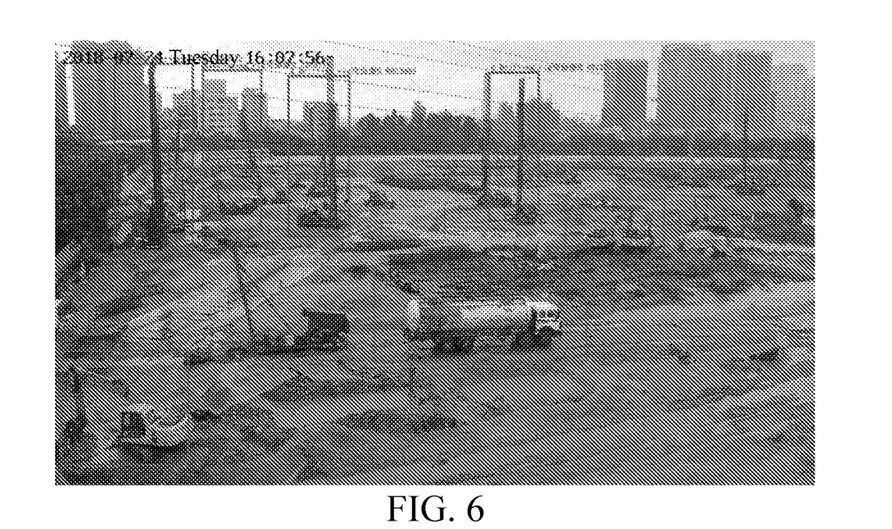
FIG. 6 is a schematic diagram of the scene of the embodiment of the present disclosure after the first type of objects is labeled.

An edge region feature library is generated, wherein, the edge region feature library can record the identification of the key object corresponding to the edge region (i.e. the edge region of which key object), and can further record the size of the edge region. For example, according to the contour map of key objects, the size of the edge region may be sensed and marked by binocular distance measurement algorithm (optionally, combined with radar ranging algorithm) (as shown in the rectangular box in FIG. 6); the feature information of the edge region is acquired; the feature information may include, but is not limited to, one or more of texture information, color information, and illumination information. The feature information of the edge region obtained in this act may be used to help build a three-dimensional model of the mask region. The acquired feature information may be recorded in the edge region feature information library.

At this time, the edge region feature library records the identification of the key object corresponding to the edge region, the three-dimensional information of the edge region and the corresponding feature information, and can further record the size of the edge region and the like.

Act 243, determining the position of the mask region, generating a mask region feature library, and speculating the point cloud data of the mask region; the position of a mask region is first obtained, which is an invisible region blocked by a key object. The location of the mask region is the location of the key object.

A mask region feature library is generated. At this time, the key objects corresponding to the mask region (i.e. which key object is blocked) are stored in the mask region feature library, and the position of each mask region can be stored.

According to the edge region feature library, the three-dimensional information and feature information of the mask region are estimated.

For any mask region, the mask region corresponds to at least one key object. Taking one corresponding key object as an example, the point cloud data corresponding to the mask region may be estimated according to the point cloud data of the edge region of the key object, for example, the following acts may be included: Act a, determining a plurality of sampling points on the outer boundary of the mask region; The number of sampling points may be determined according to the size of the mask region. The number of sampling points is different in different mask regions. The more the number of sampling points, the better the subsequent three-dimensional effect. The smaller the number of sampling points, the faster the processing speed.

The outer boundary of the mask region is the contour boundary of the key object, that is, the inner boundary of the peripheral edge region.

Act b, according to the three-dimensional information and the feature information of the edge region in the edge region feature library, determining the three-dimensional information and the feature information of each sampling point position.

Act c, for each sampling point, looking for a region whose feature information is similar to the feature information of the sampling point in the direction away from the mask region, that is, looking for an image region belonging to the same object as the sampling point.

For example, looking for regions with similar color and texture as sampling points, or looking for regions with similar texture as the sampling points. The less the features compared, the faster the processing speed, the more the features compared, and the better the later effect. When comparing three-dimensional information, if the change of three-dimensional coordinates accords with the change rule of coordinates of objects, it is considered to belong to the same object. Alternatively, the judgment may be made in combination with the contour map, so as to reduce the calculation amount and improve the processing speed. The so-called similarity means that the difference between them is within a certain preset range.

The image region is not limited within the edge region range and may extend beyond the edge region range to a background object portion.

Act d, acquiring a feature change gradient in an image region belonging to the same object as the sampling point, including but not limited to one or more of the following: a three-dimensional coordinate change gradient, a color change gradient and a texture change gradient;

For example, a feature change gradient may be determined in M directions respectively according to a fixed act size with the image region determined in Act c as a target. The range of m may be [2, 16]. Taking m=8 as an example, it is necessary to determine the feature change gradient in 8 directions: 0, 45, 90, 135, 180, 225, 270, 315 and 360 degrees. The fixed act size may be, for example, 1/N, N=[3, 5].

Act e, estimating the three-dimensional information and the feature information of the mask region according to the feature change gradient, and acquiring the point cloud data of the mask region.

For example, the point cloud data of the mask region may be obtained by supplementing the three-dimensional information and the feature information of the mask region in accordance with the direction determined in Act d and in accordance with the above-mentioned fixed act size and the feature change gradient within the mask region. When several a plurality of presumed image regions meet inside the mask region, smoothing processing may be carried out, such as linear or Gaussian blurring processing.

The mask region may further contain the back of the key object, which may be estimated according to the shape of the key object and the feature information of the front part. The front of a key object refers to the surface that may be photographed by the camera equipment, and the back refers to the surface that cannot be photographed by the camera equipment.

Act 25, splicing the estimated point cloud data of the mask region and the fused point cloud data to obtain a three-dimensional model of the target scene.

When the point cloud data in the mask region is spliced with the fused point cloud, the corner points (anchor points and splicing points) in the image are searched for splicing.

Through the above acts 21 to 25, the construction process from two-dimensional image to three-dimensional scene is preliminarily completed. When updating the three-dimensional scene later, there is no need to repeat the whole process. For example, when the three-dimensional position and/or feature information of the key object in the target scene image is changed, only acquiring the point cloud data of the key object at the changed place and updating the three-dimensional model. For example, when it is judged that the key objects change, such as the quantity of the key objects are increased, decreased, or the key objects move, etc., only the point cloud data is solved for the change part, and the dense reconstruction of three-dimensional scene can reduce the computation amount and improve the reconstruction quality.

When solving the point cloud data for the variation part, one of the following methods may be adopted:

The first method is to obtain the point cloud data at the change place of the key object through the binocular image acquisition apparatus. For example, it may include acquiring coordinates and feature information of key object change places through binocular image acquisition equipment, converting coordinates into world coordinates, generating point cloud data at change places, removing point cloud data at corresponding positions in the original three-dimensional model, and replacing with the generated point cloud data at change places.

In the second way, the three-dimensional information of the key object at the change place may be adopted to update the point cloud data of the key object. For example, it may include: acquiring the coordinates of the key object at the change location through the binocular image acquisition device, and converting it into world coordinates as the three-dimensional information of the key object at the change place. When updating the 3D model, only updating the 3D information of key objects and the feature information at the original position is retained. For example, in the live broadcast scene, the position of the anchor's arm changes, and because its feature information does not change, only three-dimensional information may be updated.

The third method is predicting the change place of the key object by using motion estimation or motion compensation, calculating the point cloud data of the change place in advance, and updating the three-dimensional model by using the point cloud data of the change place. Motion vectors may be searched by motion estimation algorithm, and motion compensation algorithm can predict the motion vectors of the previous frame or a plurality of frames, and get the local image of the current frame or the next few frames. Using motion estimation and motion compensation technology can reduce the construction task. For example, a part of point cloud data may be constructed in advance according to the results of motion estimation or motion compensation, so as to improve the processing speed. In addition, the new frame model may be compared with the predicted model to compensate for the difference.

In an exemplary embodiment, when it is determined that a background change occurs, such as adding a background or reducing a background, point cloud data may be solved only for a part of the background change amount to reconstruct a three-dimensional scene.

Alternatively, a background object feature library may be set to store at least the three-dimensional information of the background object and the feature information corresponding to the three-dimensional information (which may be added step by step in the dense reconstruction process). When updating, only the background point cloud data of the change amount part is updated. For a fixed object scene, after many times of dense reconstruction, the feature information in the background feature database is rich enough, so the three-dimensional construction may be carried out directly through the three-dimensional information and feature information in the background object feature database.

When the background object feature library is set, the key object point cloud data content and the background object point cloud data content are recorded separately, which can improve the data search speed and reduce the processing time when updating the three-dimensional model later. If the background object feature library is not set, marks may be added to the point cloud data, including but not limited to the identification of the background object, the identification of which object it belongs to, and the like.

In an exemplary embodiment, after the above acts 21 to 25 are executed, that is, after the construction process from the two-dimensional image to the three-dimensional scene is preliminarily completed, because the construction process is rough construction for ensuring the real-time, the three-dimensional scene may be updated through the subsequent continuous reconstruction process to obtain a more realistic three-dimensional display effect. For example, when updating, part or all dense point cloud data of one or a plurality of regions may be acquired every other frame or a plurality of frames of target scene images based on the feature database, and dense reconstruction is performed on the three-dimensional model with the dense point cloud data. The method for acquiring dense point cloud data of a region or part or all of a plurality of regions based on a feature database means that a part of a region, or all of a region, or part of the plurality of regions are selected from the feature database each time to obtain dense point cloud data of these parts. Because the feature database is constructed, the three-dimensional model can be updated step by step in time sharing matter, so that the display effect of the three-dimensional model gets better. Optionally, in the reconstruction process, the data in the dense point cloud data can be used.

In an exemplary embodiment, when the dense point cloud of the background object is obtained, the feature information of the background object is more and more abundant. Therefore, based on the feature information of the background object, the edge region feature library may be updated, and the point cloud data of the mask region may be estimated again, that is, the point cloud data of the mask region may be estimated with the point cloud data of the dense reconstructed edge region, so as to obtain better display effect of the mask region.

In an exemplary embodiment, virtual digital content may be added to a three-dimensional scene constructed using the method of the disclosed embodiments to construct a more distinctive digital scene.

In an exemplary embodiment, the present disclosure further provides a three-dimensional construction apparatus. The three-dimensional construction apparatus may include a processor and a memory, the memory stores a computer program executable on the processor, wherein the processor implements acts of the three-dimensional construction method in any of the above embodiments of the present disclosure when executing the computer program.

Figure 7:
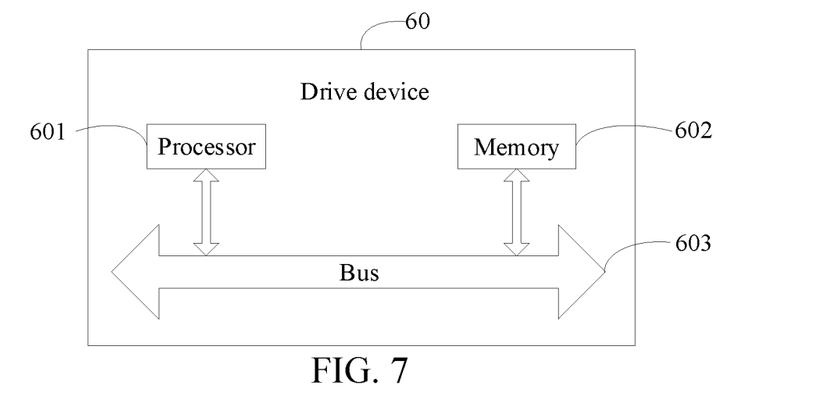
FIG. 7 is a schematic diagram of a structure of a three-dimensional construction apparatus in an embodiment of the present disclosure.

In an exemplary embodiment, FIG. 7 is a schematic diagram of a structure of a three-dimensional construction apparatus in an embodiment of the present disclosure. As shown in FIG. 7, the device 60 includes: at least one processor 601; at least one memory 602 connected to the processor 601, and a bus 603. The processor 601 and the memory 602 communicate with each other via the bus 603; and the processor 601 is configured to call program instructions in the memory 602 to execute the acts of the defect detection method and/or the defect repair method in any of the above embodiments.

The processor may be a Central Processing Unit (CPU), a Micro Processor Unit (MPU), a Digital Signal Processor (DSP), an Application Specific Integrated Circuit (ASIC), a Field Programmable Gate Array (FPGA), a transistor logic apparatus, etc., which is not limited in the present disclosure.

The memory may include a Read Only Memory (ROM) and a Random Access Memory (RAM), and provides instructions and data to the processor. A part of the memory may further include a non-volatile random access memory. For example, the memory may further store apparatus type information.

Besides a data bus, a bus may further include a power bus, a control bus and a status signal bus, etc. However, for clarity of illustration, various buses are denoted as the bus in FIG. 7.

In an implementation process, the processing performed by the processing apparatus may be completed by an integrated logic circuit of hardware in the processor or instructions in the form of software. That is, the acts of the method in the embodiments of the present disclosure may be embodied as executed and completed by a hardware processor, or executed and completed by a combination of hardware in the processor and a software module. The software module may be located in a storage medium such as a random access memory, a flash memory, a read only memory, a programmable read-only memory, or an electrically erasable programmable memory, or a register, etc. The storage medium is located in the memory, and the processor reads information in the memory and completes the acts of the foregoing methods in combination with hardware thereof. In order to avoid repetition, detailed description is not provided herein.

In an exemplary embodiment, the present disclosure further provides a three-dimensional construction system, which may include an image acquisition distance measurement apparatus and the three-dimensional scene construction apparatus described in the preceding embodiments. The image acquisition distance measurement apparatus is, for example, a binocular camera.

In an exemplary embodiment, the disclosed embodiments further provide a non-volatile computer-readable storage medium having stored thereon a computer program executable on a processor; the computer program is executed by the processor to implement the acts of the aforementioned three-dimensional scene construction method.

In the description of the embodiment of the present disclosure, it should be noted that unless otherwise specified and limited, the terms "mount", "connected" and "connect" should be understood in a broad sense. For example, a connection may be fixed connection, detachable connection or integrated connection, may be mechanical connection or electrical connection, or may be direct connection, indirect connection through intermediate medium, or communication inside two components. Those of ordinary skills in the art may understand meanings of the above-mentioned terms in the present disclosure according to situations.

It can be understood by those of ordinary skill in the art that all or some certain steps in the method disclosed above and function modules/units in the system and the apparatus may be implemented as software, firmware, hardware, and proper combinations thereof. In a hardware implementation mode, division of the function modules/units mentioned in the above description is not always division corresponding to physical components. For example, a physical component may have a plurality of functions, or a plurality of physical components may cooperate to execute a function or act. Some certain components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skill in the art, the term computer storage medium includes volatile and nonvolatile, and removable and irremovable media implemented in any method or technology for storing information (for example, a computer-readable instruction, a data structure, a program module, or other data). The computer storage medium includes, is but not limited to, a Random Access Memory (RAM), a Read-Only Memory (ROM), an Electrically Erasable Programmable ROM (EEPROM), a flash memory or other memory technologies, a Compact Disc Read-Only Memory (CD-ROM), a Digital Video Disk (DVD) or other optical discs, a cassette, a magnetic tape, a disk memory or other magnetic storage apparatuses, or any other medium configurable to store expected information and accessible by a computer. In addition, it is known to those of ordinary skill in the art that the communication medium usually includes a computer-readable instruction, a data structure, a program module, or other data in a modulated data signal, such as, a carrier or another transmission mechanism, and may include any information delivery medium.

The invention claimed is:

1. A method for constructing a three-dimensional scene, comprising:
   acquiring point cloud data of a key object and a background object in a target scene, wherein the point cloud data of the key object comprises three-dimensional information and corresponding feature information, and the point cloud data of the background object at least comprises three-dimensional information; establishing a feature database of the target scene, wherein the feature database at least comprises a key object feature library for recording three-dimensional information and feature information of the key object;
   performing registration and fusion on the point cloud data of the key object and the point cloud data of the background object, so as to obtain a three-dimensional model of the target scene; and
   when updating the three-dimensional model, reconstructing the three-dimensional model according to the feature database,
   wherein the feature database further comprises an edge region feature library and a mask region feature library;
   after performing registration and fusion on the point cloud data of the key object and the point cloud data of the background object, the method further comprises:
   determining a peripheral edge region of the key object, acquiring three-dimensional information and feature information of the peripheral edge region, and storing the three-dimensional information of the peripheral edge region, corresponding feature information of the peripheral edge region, and the key object corresponding to the peripheral edge region in the edge region feature library;
   estimating three-dimensional information and feature information of a mask region shielded by the key object based on the edge region feature library, storing three-dimensional information of a mask region, corresponding feature information of the mask region, and the key object corresponding to the mask region in the mask region feature library; and
   updating the three-dimensional model of the target scene based on the mask region feature library.

2. The three-dimensional scene construction method according to claim 1, wherein the estimating the three-dimensional information and feature information of the mask region shielded by the key object based on the edge region feature library comprises:
   for any mask region, determining the key object corresponding to the mask region;
   determining the three-dimensional information and the feature information of the peripheral edge region corresponding to the key object according to the edge region feature library;
   determining change rules of the three-dimensional information and the feature information according to the three-dimensional information and the feature information of the peripheral edge region; and
   estimating the three-dimensional information and the feature information of the mask region according to the change rules of the three-dimensional information and the feature information.

3. The three-dimensional scene construction method according to claim 2, wherein determining the change rules of the three-dimensional information and the feature information according to the three-dimensional information and the feature information of the peripheral edge region comprises:
   determining a plurality of sampling points on an outer boundary of the mask region, wherein the outer boundary of the mask region is overlapped with an inner boundary of the peripheral edge region;
   determining three-dimensional information and feature information of each sampling point according to the three-dimensional information and the feature information of the peripheral edge region;
   for each sampling point, searching an image region with similar feature information as the sampling point in a direction away from the mask region; and
   acquiring a three-dimensional information change gradient and a feature information change gradient in the image region.

4. The three-dimensional scene construction method according to claim 3, further comprising:
   when a three-dimensional position and/or the feature information of the key object in the target scene image is changed, acquiring the point cloud data of the key object at a changed place and updating the three-dimensional model.

5. The three-dimensional scene construction method according to claim 2, further comprising:
   when a three-dimensional position and/or the feature information of the key object in the target scene image is changed, acquiring the point cloud data of the key object at a changed place and updating the three-dimensional model.

6. The three-dimensional scene construction method according to claim 2, wherein reconstructing the three-dimensional model according to the feature database when updating the three-dimensional model comprises:
   based on the feature database, acquiring part or all dense point cloud data of one or a plurality of regions every other frame or a plurality of frames of target scene images, and performing dense reconstruction on the three-dimensional model with the dense point cloud data.

7. The three-dimensional scene construction method according to claim 1, further comprising:
   when a three-dimensional position and/or the feature information of the key object in the target scene image is changed, acquiring the point cloud data of the key object at a changed place and updating the three-dimensional model.

8. The three-dimensional scene construction method according to claim 7, wherein acquiring the point cloud data of the key object at the changed place comprises:
   acquiring the point cloud data at the change place of the key object through an image acquisition apparatus; or,
   using the three-dimensional information of the key object at the change place to update the point cloud data of the key object; or
   predicting the change place of the key object by using motion estimation or motion compensation, calculating the point cloud data of the change place in advance, and updating the three-dimensional model by using the point cloud data of the change place.

9. The three-dimensional scene construction method according to claim 8, wherein after predicting the change place of the key object by using motion estimation or motion compensation and calculating the point cloud data of the change place in advance, the method further comprises:

acquiring a current actual point cloud data of the key object in the target scene, comparing the current actual point cloud data with the pre-calculated point cloud data, determining point cloud data of the difference part, and re-updating the three-dimensional model with the point cloud data of the difference part.

10. The three-dimensional scene construction method according to claim 1, wherein reconstructing the three-dimensional model according to the feature database when updating the three-dimensional model comprises:

based on the feature database, acquiring part or all dense point cloud data of one or a plurality of regions every other frame or a plurality of frames of target scene images, and performing dense reconstruction on the three-dimensional model with the dense point cloud data.

11. The three-dimensional scene construction method according to claim 10, further comprising:

estimating point cloud data of a mask region using the point cloud data of a dense reconstructed edge region, and updating the three-dimensional model.

12. The three-dimensional scene construction method according to claim 10, further comprising:

estimating point cloud data of adjacent positions by using acquired dense point cloud data.

13. The three-dimensional scene construction method according to claim 1, wherein the feature database comprises a key object feature library, an edge region feature library and a mask region feature library, wherein: the key object feature library is used for storing three-dimensional information of key objects and corresponding feature information of key objects; the edge region feature library is used for storing three-dimensional information of the peripheral edge region, corresponding feature information of the peripheral edge region and key objects corresponding to the peripheral edge region; and the mask region feature library is used for storing three-dimensional information of the mask region, corresponding feature information of the mask region and key objects corresponding to the mask region.

14. The three-dimensional scene construction method according to claim 1, further comprising:

adding objects in the target scene as the key objects, and performing dense reconstruction on the newly added key objects.

15. A computer device, comprising a processor and a memory storing a computer program runnable in the processor, wherein the processor executes the program to implement the method according to claim 1.

16. A three-dimensional scene construction system, comprising an image acquisition and distance measurement apparatus and a computer device according to claim 15.

17. A non-transitory computer-readable storage medium, storing a computer program executable on a processor, wherein when the computer program is executed by a processor, the method according to claim 1 is implemented.

* * * * *